(12) United States Patent
Berney

(10) Patent No.: US 12,409,518 B2
(45) Date of Patent: Sep. 9, 2025

(54) FASTENER REMOVAL TOOL

(71) Applicant: Government of the United States, as represented by the Secretary of the Air Force, Wright-Patterson AFB, OH (US)

(72) Inventor: Chandler Berney, Oklahoma City, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 311 days.

(21) Appl. No.: 17/958,502

(22) Filed: Oct. 3, 2022

(65) Prior Publication Data

US 2023/0339054 A1 Oct. 26, 2023

Related U.S. Application Data

(60) Provisional application No. 63/334,954, filed on Apr. 26, 2022.

(51) Int. Cl.
*B23P 19/00* (2006.01)
*B23P 19/06* (2006.01)
*B25B 27/02* (2006.01)

(52) U.S. Cl.
CPC ............ *B23P 19/06* (2013.01); *B25B 27/026* (2013.01)

(58) Field of Classification Search
CPC ......... B23P 19/00; B23P 19/06; B23P 19/027; B23P 19/043; B23P 19/066; B23P 19/10; B25B 27/00; B25B 27/06
See application file for complete search history.

(56) References Cited

U.S. PATENT DOCUMENTS

| | | | | |
|---|---|---|---|---|
| 2,706,103 A * | 4/1955 | Stambaugh | ............. | B25C 11/02 254/19 |
| 2,735,649 A * | 2/1956 | Swallert | .................. | B25C 11/02 254/18 |
| 2,902,751 A | 9/1959 | Sommer | | |
| 3,069,761 A * | 12/1962 | Sommer | ............... | B25B 27/026 294/206 |
| 3,643,918 A * | 2/1972 | Ellis | ........................ | B25C 11/02 254/19 |
| 6,113,073 A * | 9/2000 | Lefavour | ................ | E01B 29/26 254/24 |
| 6,526,641 B1 * | 3/2003 | Latham | ................... | E21C 35/18 29/239 |

(Continued)

*Primary Examiner* — Lee D Wilson
(74) *Attorney, Agent, or Firm* — AFMCLO/JAZ; Jeffrey V. Bamber

(57) ABSTRACT

A powered tool for removing mechanical fasteners from materials. The fastener removal tool includes: a fastener puller for engaging the head of a fastener; a stand-off mount for placing against a surface having a fastener therein; a rod joined to the fastener puller; and a power source operatively connected to the rod. The fastener removal tool may exert a pulling force on the head of a fastener in the form of repeating intermittent strikes on the underside of the head of a fastener with said fastener puller. The fastener removal tool may have an indicator mechanism for indicating whether the fastener puller completely engages a fastener. The fastener removal tool may have a fastener lubricating system for lubricating difficult to remove fasteners.

10 Claims, 12 Drawing Sheets

(56) References Cited

U.S. PATENT DOCUMENTS

| | | | |
|---|---|---|---|
| 6,601,277 B1* | 8/2003 | Swanson | B25B 27/023 29/259 |
| 7,963,012 B1* | 6/2011 | Brasher | A63B 60/06 29/244 |
| 9,457,458 B2 | 10/2016 | Wagstaff et al. | |
| 9,616,554 B2 | 4/2017 | Hendrix, II | |
| 10,688,637 B2 | 6/2020 | Hare et al. | |
| 11,123,848 B2 | 9/2021 | Wojciechowski et al. | |
| 2004/0187283 A1* | 9/2004 | Oser | B25B 27/0035 29/252 |
| 2012/0317767 A1* | 12/2012 | Bathurst | B23P 19/00 29/243.53 |
| 2016/0023334 A1* | 1/2016 | Rowe | F16D 3/405 29/244 |
| 2023/0339054 A1* | 10/2023 | Berney | B25B 27/18 |

* cited by examiner

FASTENER REMOVAL TOOL

Pursuant to 37 C.F.R. § 1.78(a)(4), this application claims the benefit of and priority to prior filed Provisional Application Ser. No. 63/334,954, filed Apr. 26, 2022, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to tools for removing fasteners and, more particularly, to a powered tool for removing fasteners.

BACKGROUND OF THE INVENTION

Fasteners for fastening various components together are well known. In some cases, fasteners may need to be removed. Fasteners may, for example, become stuck in a component and be partially exposed so that they stick out of the surface of a component.

TAPER-LOK® fasteners used on aircraft structures which need to be removed often become stuck in their housing with the neck of the fastener partially exposed. The typical method of removing these fasteners is by using a rivet gun to drive them out from below and wedges to simultaneously apply upward pressure. This method is dangerous, time consuming, and inefficient.

Methods to remove other stuck fasteners include the use of tools such as pry bars, pliers, hammers, and wedge tools in order push, pry, or pull fasteners out using manual force. These methods are inefficient and slow, limited to the force the person using these tools can apply, potentially damaging to the surface the fasteners are connected to, potentially dangerous to the person performing the task, and unwieldy and bulky.

The search for improved tools and methods for removing fasteners has, therefore, continued.

SUMMARY OF THE INVENTION

The present invention relates generally to tools for removing fasteners and, more particularly, to a powered tool for removing fasteners. The powered tool can be pneumatic, hydraulic, magnetic, electric, or electronic.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment, a fastener removal tool is provided for removing a fastener having a head that is partially protruding from the surface of an article. The fastener removal tool comprises:
- a fastener puller for engaging the head of a fastener, the head of the fastener having a top surface and an underside;
- a stand-off mount for placing against a surface having a fastener therein, the stand-off mount having two ends comprising a surface-contacting end and an opposing end, a passageway between the ends;
- a first rod joined to the fastener puller and passing part of the way through the passageway in the stand-off mount; and
- a power source having a piston rod that is joined to said first rod, wherein the power source controls the motion of the first rod,
- wherein the fastener removal tool is configured to have one setting in which it exerts a pulling force on the head of a fastener in the form of repeating intermittent strikes on the underside of the head of a fastener with the fastener puller.

According to another embodiment, a method of removing a fastener from an article is provided. The fastener has a body and a head joined to the body. The fastener head has a top surface and an underside. The fastener head protrudes from the surface of the article so that a gap is provided between the underside of the fastener head and the surface of the article. The method comprises:
a) providing a powered fastener removal tool comprising:
- a fastener puller for engaging the head of a fastener;
- a stand-off mount for placing against a surface of an article having a fastener therein, wherein the stand-off mount has a passageway therethrough and the fastener puller is positioned for reciprocating motion in the passageway; and
- a power source operatively connected to the fastener puller, wherein the power source is in communication with an actuator that controls the motion of the fastener puller;

b) placing the stand-off mount against the surface of the article and engaging the head of the fastener with the fastener puller;
c) actuating the fastener puller with the actuator; and
d) exerting a repeating intermittent striking force on the underside of the head of a fastener with the fastener puller using the powered fastener removal tool.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to tools for removing fasteners and, more particularly, to a powered tool for removing fasteners. The powered tool can be powered by pneumatic, hydraulic, magnetic, electric, or electronic force. The application of pneumatic and hydraulic forces may be referred to generically herein as "fluid powered".

The fastener removal tool and the methods described herein can be used to remove many different types of fasteners in many different industries. The types of fasteners and industries the fastener removal tool and the methods can be used in include, but are not limited to: aircraft maintenance/construction, automotive maintenance/construction, aquatic maintenance/construction, carpentry, general industrial solutions, general construction uses, general maintenance uses, general disassembly and demolition uses, ground stake removal, post removal, door/window removal.

Figure 1:
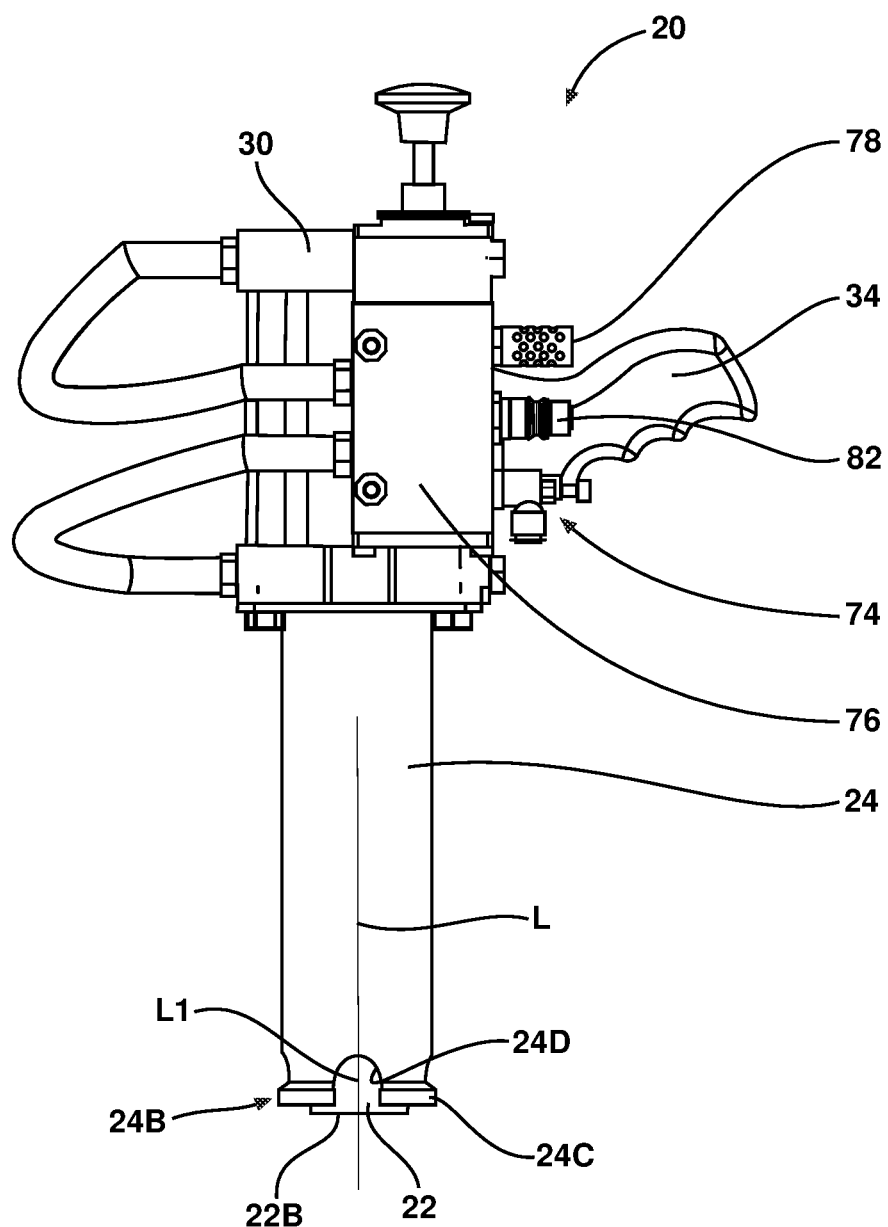
FIG. 1 is a side view of one embodiment of a fastener removal tool.

FIG. 1 shows one non-limiting embodiment of a fastener removal tool 20. This particular fastener removal tool may be particularly useful in removing TAPER-LOK® tapered shank bolt fasteners. TAPER-LOK® fasteners are commonly used to fasten aircraft splice plates to portions of aircraft. TAPER-LOK® fasteners have a head and a tapered body or shank which is wider near the head than at the end. The shank is threaded at the end for receiving a nut. These fasteners are installed into a tapered hole, and are designed to provide an interference fit upon installation. The fastener removal tool 20 can, however, be used to remove any of the types of fasteners described herein.

The fastener removal tool 20 when in use generally comprises: a fastener head puller ("fastener puller" or "fastener gripper") 22 for engaging the head of a fastener; a stand-off mount 24 for placing against a surface having a fastener therein; a rod 26 (shown in FIG. 2) joined to the fastener puller 22 and passing part of the way through a passageway in the stand-off mount 24; a power source such as a pneumatic (or air) cylinder 30 joined to the rod 26. The fastener removal tool 20 may have a longitudinal axis, L. In the case of a pneumatically powered fastener removal tool 20, the pneumatic cylinder 30 controls the motion of the rod 26. An air flow direction control may be operationally connected to the pneumatic cylinder 30. The fastener removal tool 20 may also comprise a handle 34. The fastener removal tool 20 may comprise additional components as described herein.

Figure 1A:
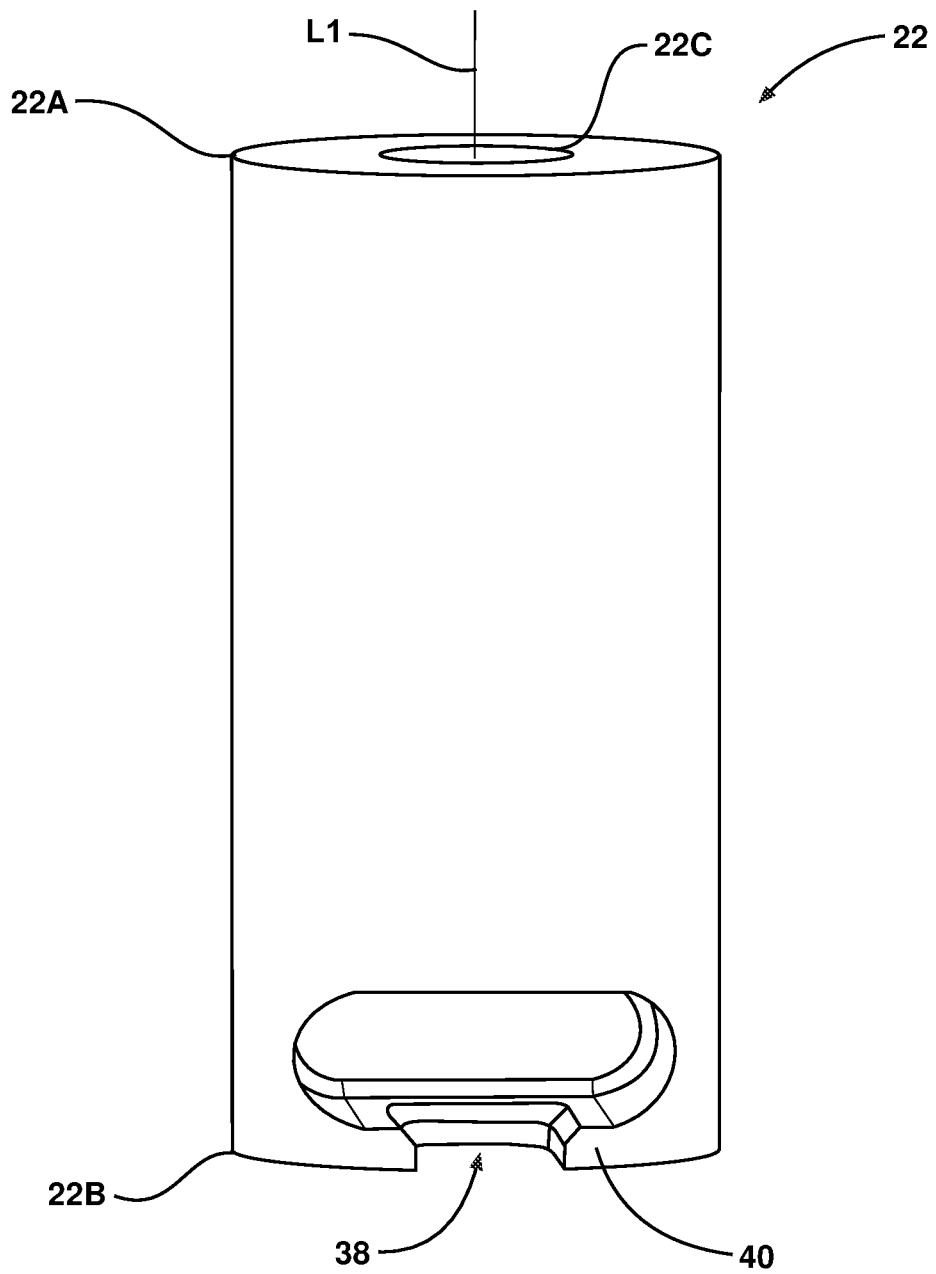
FIG. 1A is an enlarged perspective view of one embodiment of the fastener puller that can be used with the fastener removal tool.

FIG. 1A shows one embodiment of a fastener puller 22. The fastener puller 22 may comprise any type of component that is suitable for engaging the head of a fastener. The fastener puller 22 conforms to the head and neck of the targeted fastener in order to grasp the fastener which prevents or reduces damage to the fastener and work surface. The fastener puller 22 should also be capable of withstanding the application of a force thereto, which is in turn, exerted on the head of the fastener, in order to remove fasteners from various articles. The fastener puller 22 may have different configurations for different sizes and types of fasteners. The fastener puller 22 is used as part of the fastener removal tool 20 during use. However, the fastener removal tool 20 and the fastener puller 22 may be provided separately (much like a drill and drill bits) so that it need not comprise part of the fastener removal tool 20 per se.

Figure 2:
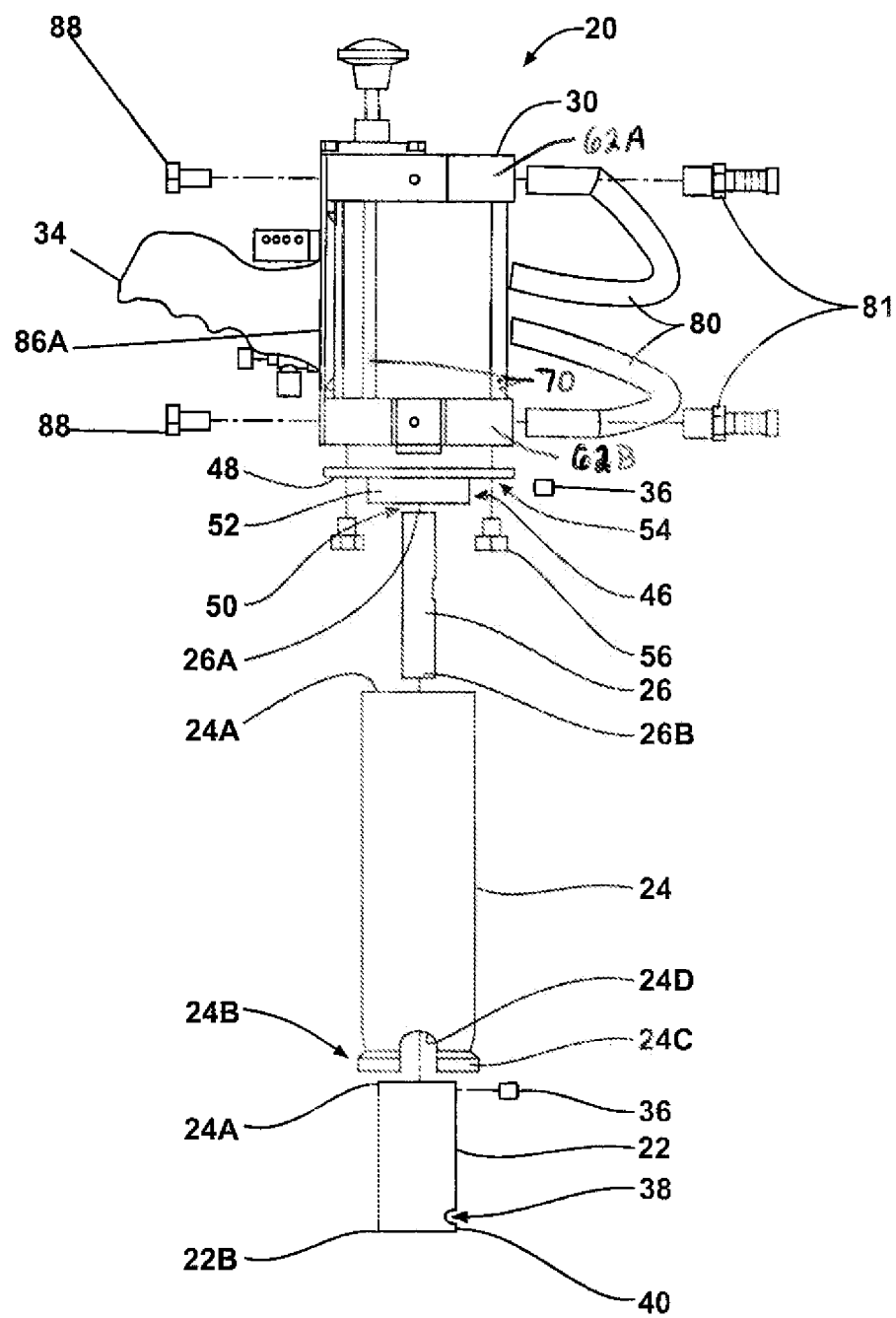
FIG. 2 is an exploded view of the fastener removal tool.
Figure 3:
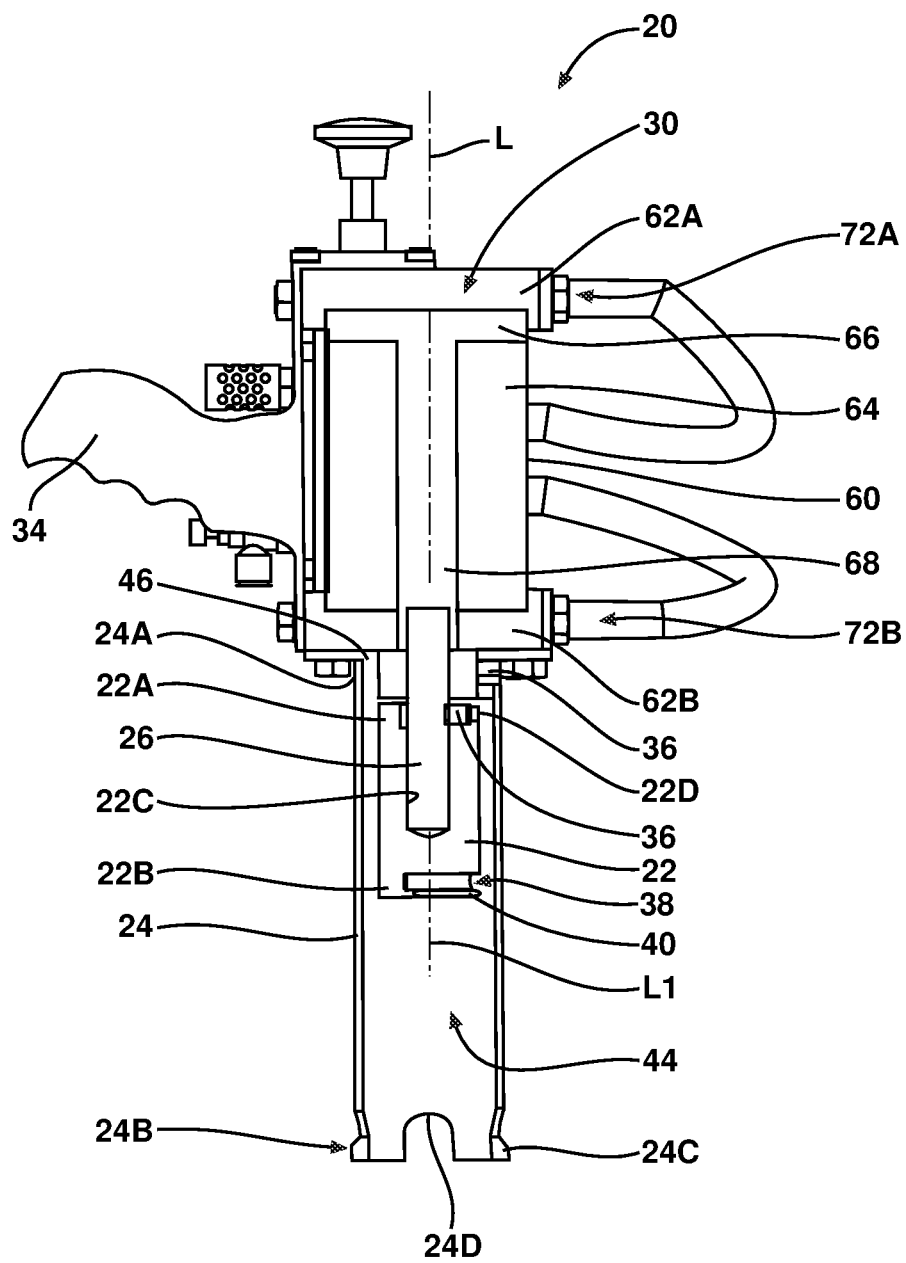
FIG. 3 is a side view of the fastener removal tool in FIG. 1, shown from the other side, with a portion partially cut away.

In the embodiment shown in FIGS. 1A to 3, the fastener puller 22 has a generally cylindrical configuration with a longitudinal axis L1. The fastener puller 22 has an inner end 22A and an outer end 22B. FIG. 3 shows that the fastener puller 22 is joined adjacent its inner end 22A to the rod 26 of the fastener removal tool 20. More specifically, in the embodiment shown, the inner end 22A of the fastener puller 22 is joined to the rod 26 of the fastener removal tool 20 by providing an axial bore 22C that extends from the inner end 22A of the fastener puller part of the way into the interior of the fastener puller 22. The axial bore 22C may be threaded or smooth (unthreaded). The rod 26 fits into this axial bore 22C. The rod 26 can be retained in the bore 22C by a retaining element such as a set screw 36 that passes through an opening 22D in the side of the fastener puller 22 that is oriented perpendicular to the axis A1 of the fastener puller 22.

The outer end 22B of the fastener puller 22 is used to engage a fastener. As shown in FIGS. 1A to 3, the outer end 22B of the fastener puller 22 has a recessed pocket 38 formed therein that is configured to fit the target-sized fastener. The recessed pocket 38 has an opening that is configured to accept the head of a fastener, and an engagement feature 40 that fits under the head of a fastener. The recessed pocket 38 includes a channel for the neck of the fastener, the sides of which channel are defined by the engagement feature 40. The fastener puller 22 can be made of any suitable material by any suitable process. In some cases, the fastener puller 22 is machined from a 304 stainless steel rod.

The stand-off mount 24 may have a generally hollow cylindrical configuration. The stand-off mount has two ends comprising an inner end 24A and an opposing surface-contacting end 24B. The surface-contacting end 24B can be tapered inward toward the longitudinal axis L, and can then widen into a flange 24C at the distal end thereof. The flange 24C will rest against the surface containing the fastener that will be removed. A passageway 44 (shown in FIG. 3) extends between the ends 24A and 24B. The sides of the stand-off mount 24 may have at least one recess 24D therein so that the user will be able to see the fastener. The stand-off mount 24 may have multiple openings or recesses 24D formed on the surface-contacting end 24B that allow for viewing of the work area and increased maneuverability. If there are multiple openings, these may be formed between multiple distinct contact surfaces or "feet" that contact the work surface. The stand-off mount 24 can be made of any suitable material by any suitable process. Suitable materials include, but are not limited to metals, plastics, and composite materials such as carbon fiber nylon. Suitable processes for making the stand-off mount 24 include, but are not limited to 3D printing and casting.

The stand-off mount 24 may be joined to a stand-off mount-receiving component (or face plate) 46 as shown in FIG. 2. The stand-off mount-receiving component 46 may comprise a plate 48 having an opening 50 in its center. A receiving element, which may be a cylindrical element 52, is joined to the plate 48 and extends outward perpendicularly from one side of the plate 48 and surrounds the opening 50 in the plate. The plate 48 and the cylindrical element 52 can comprise two components that are joined together, or they may comprise a single integrally-formed component. In the embodiment shown in the drawings, the plate 48 has a plurality of holes 54 therein for joining the stand-off mount-receiving component 46 to an air cylinder 30 using screws 56. FIG. 3 shows that the cylindrical element 52 may have at least one opening in the side thereof for a fastener (such as a set screw 36) to pass through in order to join the stand-off mount 24 to the stand-off mount-receiving component 46. The stand-off mount-receiving component 46 can be made of any suitable material by any suitable process including those described for the stand-off mount. In one case, the stand-off mount-receiving component 46 may be a 3D printed carbon fiber nylon structure.

The rod ("threaded rod" or "first rod") 26 joins the fastener puller 22 to the piston rod of the air cylinder. The rod 26 has an inner end 26A and an outer end 26B. The rod 26 extends part of the way into the passageway 44 in the stand-off mount 24. The inner end 26A of the rod 26 is joined to the actuator of the air cylinder. The inner end 26A of the rod 26 may be joined to the actuator of the air cylinder in any suitable manner. For example, at least a portion of the rod 26 at inner end 26A thereof may be threaded, and the inner end 26A of the rod 26 may be screwed into the mouth of the actuator of the air cylinder 30. The outer end 26B of the rod 26 is joined to the fastener puller 22 as described above.

Figure 4:
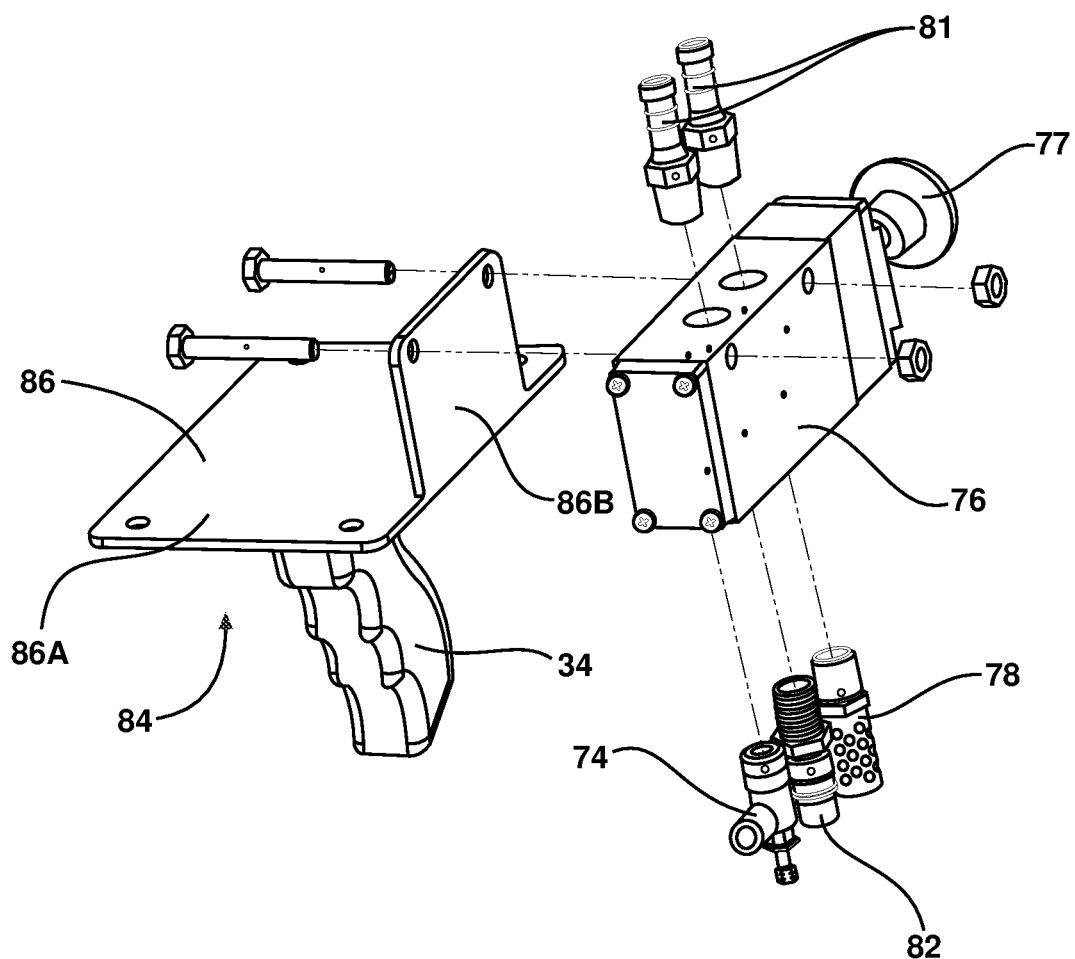
FIG. 4 is an exploded view of the handle plate assembly.

The pneumatic cylinder (or "air cylinder") 30 is used to move the rod 26 and provide force on the head of a fastener using the fastener puller 22 in order to remove the fastener. The air cylinder 30 can comprise any suitable type of air cylinder. In the embodiment shown in the drawings, the fastener removal tool 20 comprises a linear tie rod pneumatic cylinder. The air cylinder 30 may comprise a tube or barrel cylinder 60 with an end cap 62A and 62B on each end to form an air chamber 64. The air cylinder 30 may comprise a piston 66; a piston rod 68; and tie rods 70 that are joined to the end caps to hold the end caps in place. FIG. 3 shows that the air cylinder 30 may have forward and reverse flow inlets 72A and 72B, respectively, that are formed in portions of the air cylinder such as in the end caps 62A and 62B. FIG. 4 shows that the air cylinder 30 may also comprise: an air flow control valve 74, an air direction control device 76, and a muffler 78. FIG. 2 shows that the air cylinder 30 may comprise air hoses 80 that are joined to the end caps of the air cylinder at hose fittings 81. The air cylinder 30 may further comprise a quick disconnect hose coupler 82 (shown in FIG. 4) for connecting the air cylinder 30 to a source of compressed air. The air cylinder 30 can be any suitable commercially available air cylinder. One suitable commercially available air cylinder is the MCMASTER-CARR® square face compact air cylinder item 6113K232 available from McMaster-Carr Supply Company, Elmhurst, Illinois, U.S.A. The air cylinder 30 is in operatively connected to the rod 26 as described above.

The air flow control valve 74 controls the speed of air-powered equipment by adjusting the volume of air flow. The air flow control valve 74 can be any suitable commercially available air flow control valve. One suitable commercially available air flow control valve is item 62005K233 available from McMaster-Carr Supply Company. In some cases, the air flow control valve 74 can be replaced with another muffler 78, such as McMaster-Carr high flow muffler item number 9835K42.

The air flow direction control device (or "air manifold") 76 is used to extend and then retract the piston in the air cylinder 30. The air flow direction control device 76 can be any suitable commercially available air flow direction control device. One suitable commercially available air flow direction control device is the MCMASTER-CARR® air directional control valve item 6859K51 available from McMaster-Carr Supply Company. This air flow direction control device 76 allows the piston rod 68 in the air cylinder 30 to be extended and retracted at different speeds. This device allows each action to be controlled by joining a flow control valve to each exhaust port. This particular device is known as a 4-way or 5/2 valve. The air flow direction control device 76 is provided with a push button actuator 77 that enables the operator to retract or extend the piston rod 68 of the air cylinder 30. Other commercially available air flow direction control devices may be provided with a quick alternating solenoid that will cause the piston rod 68 of the pneumatic cylinder 30 to rapidly extend and retract. One such commercially available fast-switching, two-speed, two-action electrical air flow direction control device is MCMASTER-CARR® item 2974N11. The air flow direction control device 76 can be joined to any suitable portion of the fastener removal tool 20. In the embodiment shown, the air flow direction control device 76 is joined to a portion of the handle plate.

The handle 34 is an optional, but useful feature of the fastener removal tool 20. The handle 34, in the embodiment shown, is part of a handle plate assembly 84 that is shown in detail in FIG. 4. In the embodiment shown, the handle plate assembly 84 comprises a handle plate and the handle 34. The handle plate may be in the form of a plate 86 having a 90° bend in the same to form a first portion 86A and a second portion 86B. The handle 34 is attached to the first portion 86A of the handle plate. The handle plate is used to join the handle 34 to the body of the fastener removal tool 20. The handle 34 can be joined to any suitable portion of the fastener removal tool 20. In the embodiment shown, the handle 34 is joined to the side of the air cylinder 30. As shown in FIG. 2, the first portion 86A of the handle plate is joined to the side of the air cylinder 30 with screws 88. The handle 34 and handle plate assembly 84 can be made of any suitable material by any suitable process including those described for the stand-off mount 24. In some cases, the handle 34 may comprise part of a 3D printed carbon fiber nylon combination receiving plate and handle.

Figure 5:
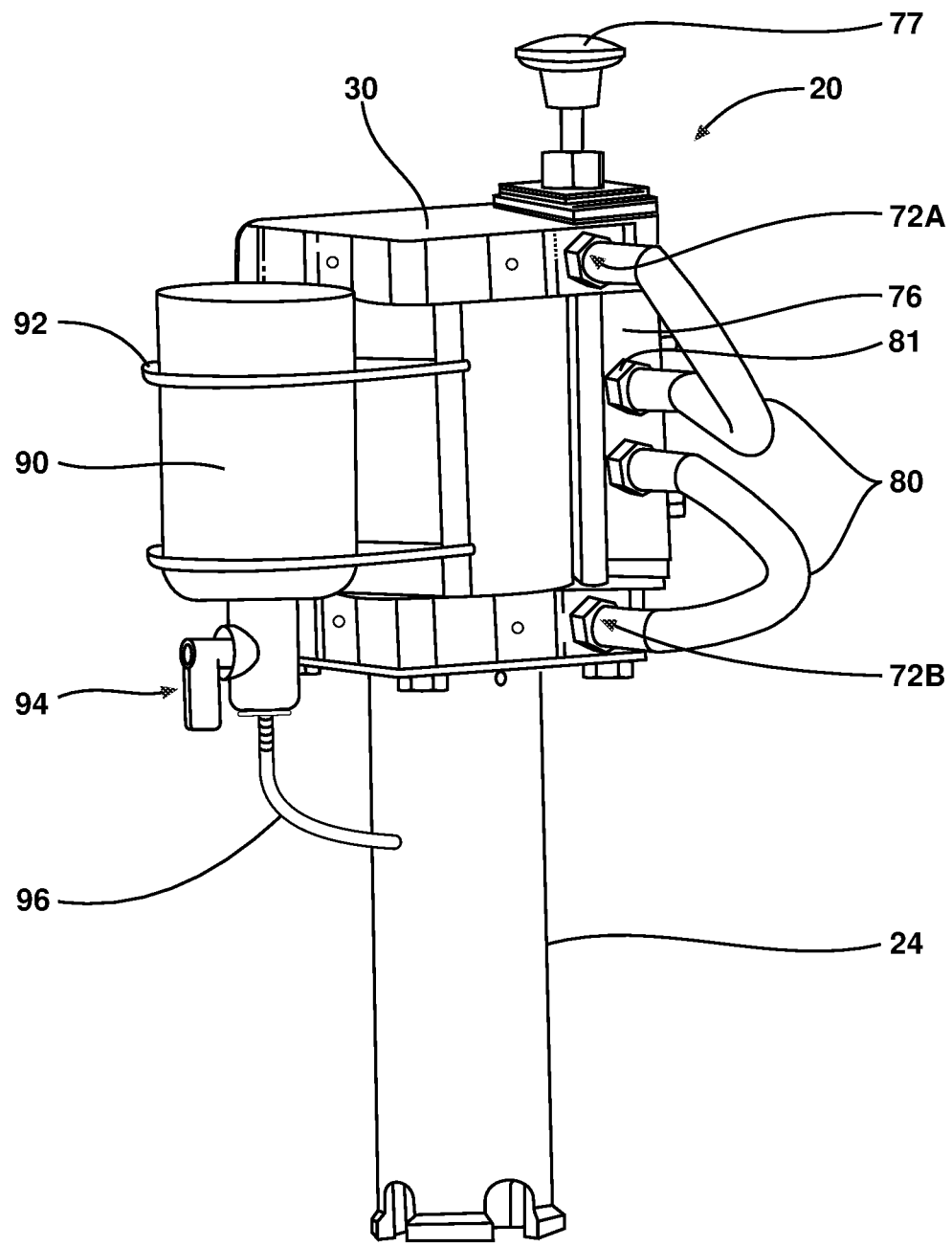
FIG. 5 is a perspective view of an alternative embodiment of the fastener removal tool at includes additional features.
Figure 6:
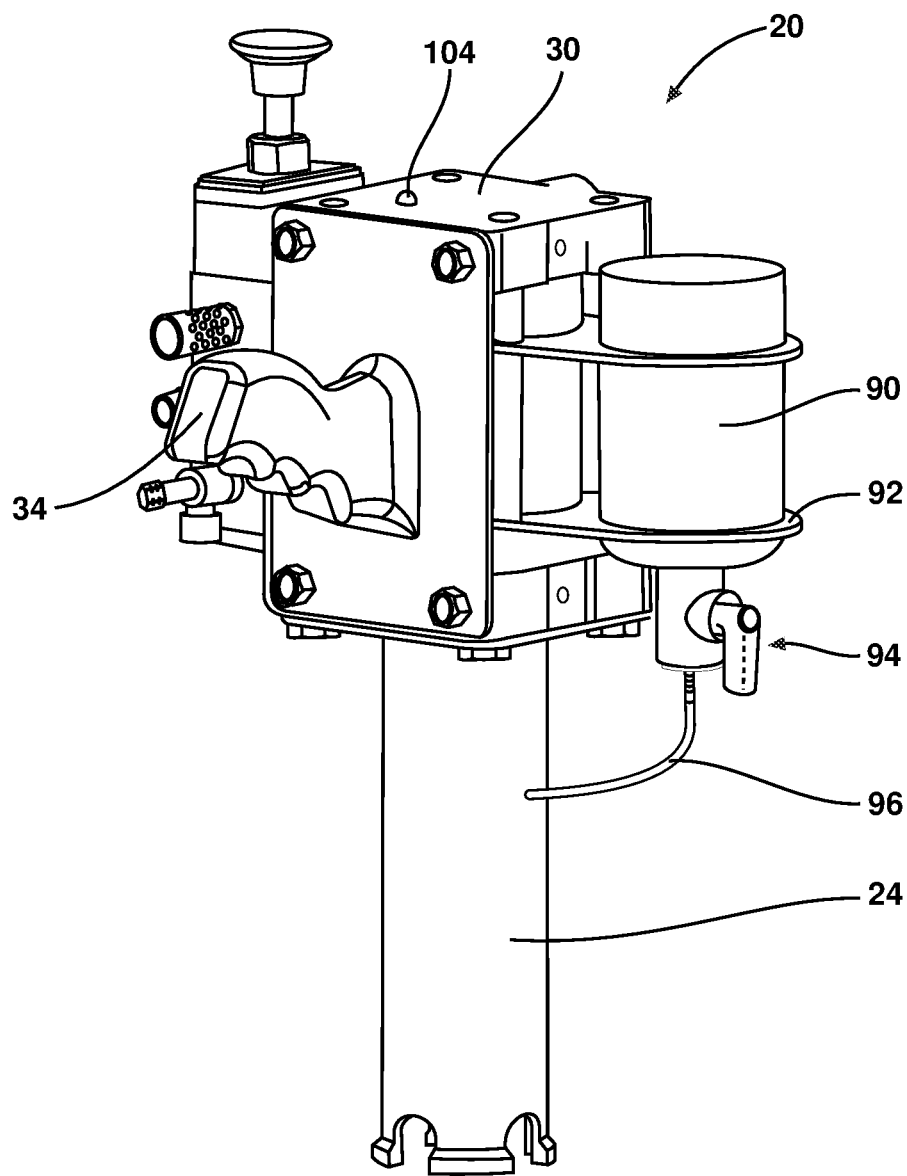
FIG. 6 is a perspective view of the alternative fastener removal tool in FIG. 5 shown from another angle.
Figure 7:
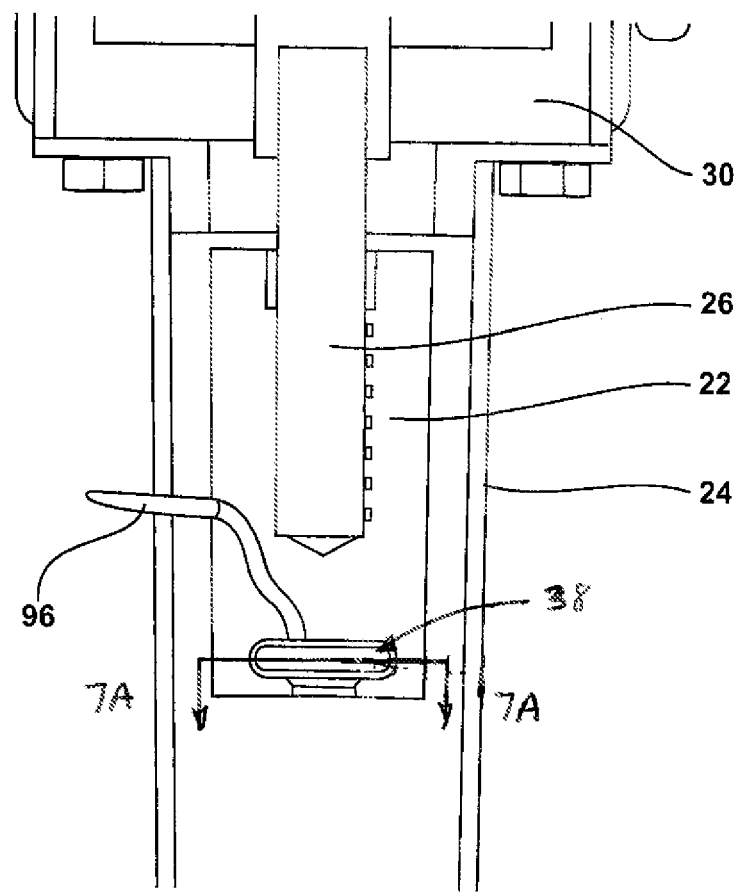
FIG. 7 is a partially cut away side view of a portion of the fastener removal tool in FIG. 5.

The fastener removal tool 20 may have additional or optional components. The optional or additional components can comprise separate inventive subject matter on a fastener removal tool 20 that does not have certain other features described herein (such as the ability to exert a pulling force on the head of a fastener in the form of a repeating intermittent strikes on the underside of the head of a fastener with said fastener puller). For example, the fastener removal tool 20 may comprise components for lubricating fasteners that are difficult to remove. For example, as shown in FIGS. 5-6 a liquid tank 90 may be joined to the pneumatic cylinder 30 with mounting brackets 92. The liquid tank 90 may contain any suitable lubricating liquid including, but not limited to at least one of: a solvent, a penetrating lubricant, or liquid nitrogen. A liquid flow valve 94 may be joined to the end of the liquid tank 90 to dispense the desired amount of liquid. A liquid transport tube 96 connects to the end of the valve 94 and passes through a hole in the stand-off mount 24. FIG. 7 shows the liquid transport tube 96 carries the liquid into a channel in the fastener puller 22 that dispenses the liquid onto the fastener.

Figure 7A:
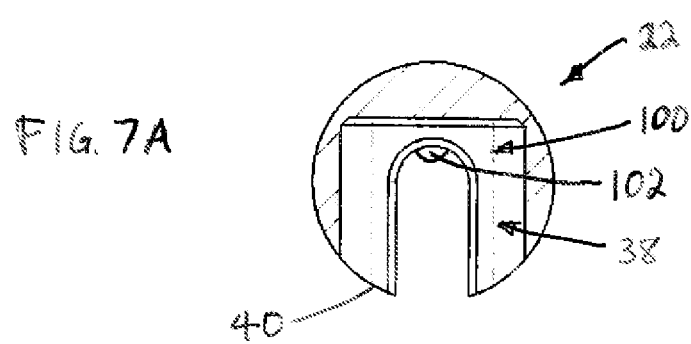
FIG. 7A is a cross-section taken along line 7A-7A of FIG. 7.
Figure 8:
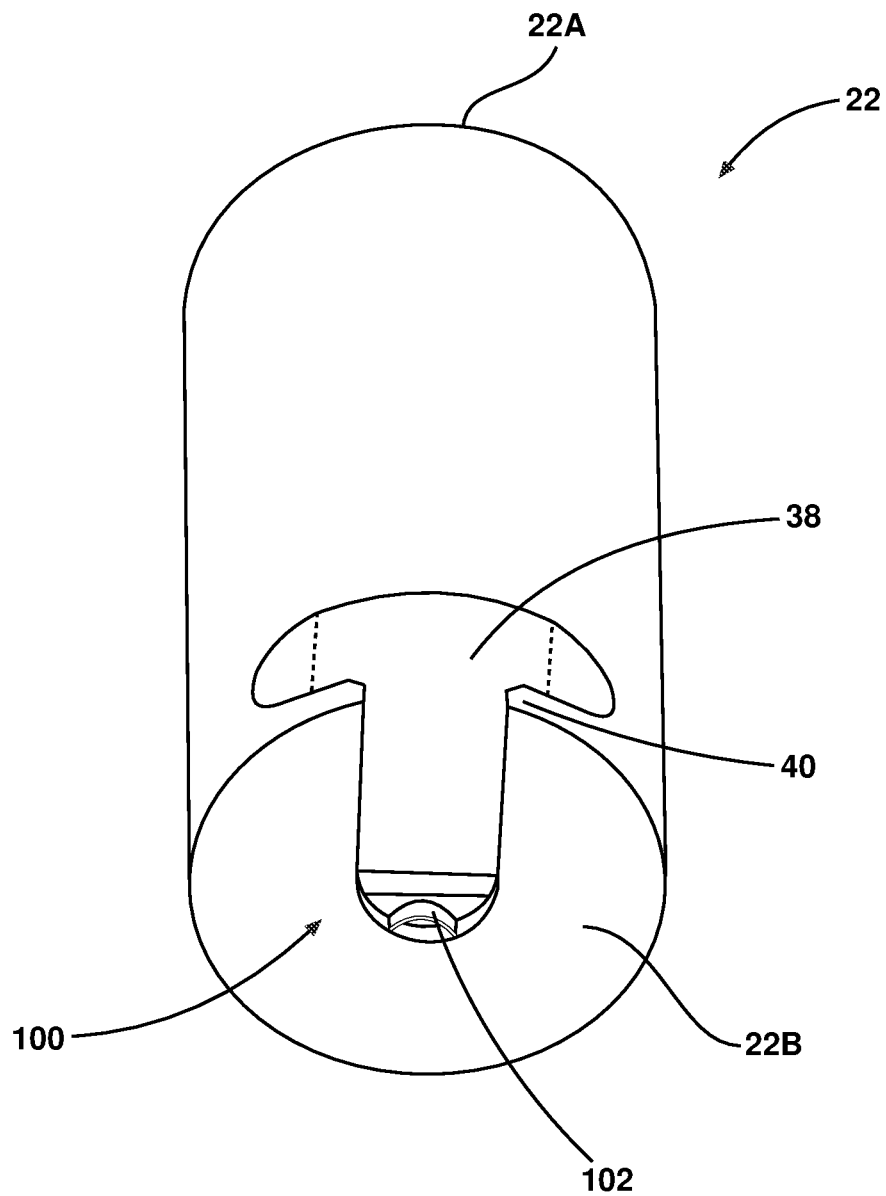
FIG. 8 is a bottom perspective view showing one embodiment of a sensor inside the fastener puller.

FIGS. 7A and 8 show that the fastener removal tool 20 may also comprise a system 100 for ensuring that the fastener puller 22 is properly positioned to remove a fastener. For example, a sensor 102 can be used to determine if the fastener puller 22 is correctly positioned to remove a fastener. The sensor 102 can be any suitable type of sensor including, but not limited to one or more of the following: an optical sensor, a pressure sensor, an electrical sensor, a laser sensor, a strain sensor, and a proximity switch. The sensor 102 can be placed in any suitable location. In some cases, the sensor 102 may be placed in the recessed pocket 38 of the fastener puller 22 to sense when the fastener puller 22 is correctly positioned around the head of a fastener. In one example, an electrical sensor can be provided and positioned so that the fastener will complete a circuit. In the example shown in the drawings, the sensor 102 comprises a flexible material that has an electrical contact on it that completes a circuit when it is pressed in by the fastener being pushed against the back of the fastener puller 22.

The components of the fastener removal tool 20 can be made in any suitable manner, and from any suitable materials. The standoff mount 24, stand-off mount-receiving component 46, and handle plate assembly 84 may, for example, be 3D printed on a Stratasys FORTUS™ 450 MC 3D printer, available from Stratasys, Ltd. of Eden Prairie, MN, U.S.A. in nylon 12 carbon fiber. The air manifold/flow direction control device 76, pneumatic alternating solenoid, quick disconnect air fittings, air hoses 80, air flow mufflers, nuts, bolts, washers, and threaded rod 26, and air cylinder 30 are off the shelf items that are connected to the handle plate assembly 84, stand-off mount receiving component 46, and standoff mount 24 using the nuts and bolts. It is expressly not admitted, however, that any of the components are known for being assembled into a fastener removal tool 20 as described herein.

The components of the fastener removal tool 20 can be arranged in any suitable manner. In the embodiment shown, the push button actuator 77, the pneumatic cylinder 30, standoff mount 24, threaded rod 26, and fastener puller 22 may be assembled in line with each other and act in a linear motion that is aligned with the target fastener to be removed. The handle 34 protrudes out perpendicular to the body of the rest of the device 20. In this configuration, the operator operates the tool with both hands simultaneously, thus providing a degree of safety by keeping the operator's hands away from any powered components. The quick disconnect air fitting 82 is attached to the inlet of the air manifold 76, the two exhaust mufflers 78 to the exits of the manifold, and the air hoses 80 from the controlled exits of the manifold to the inlets of the air cylinder.

The components of the fastener removal tool 20 can be assembled as follows. The fastener puller 22 is joined to the tie rod cylinder 30 using the threaded rod 26 and locked in place using a set screw 36. The stand-off mount 24 is slipped onto the standoff mount receiving component 46 and held in place using a set screw 36. The quick disconnect fittings, and air flow mufflers 78 are screwed into the air flow regulator/flow direction control device 76. The air hoses 80 connect the differing flow exits from the control device to the forward and reverse flow inlets on the tie rod cylinder 30. The liquid tank 90 may be joined to the pneumatic cylinder 30 with mounting brackets 92. The liquid flow valve 94 is joined to the end of the liquid tank 90 and the liquid transport tube 96 connects to the end of the valve and carries the liquid into a channel in the fastener puller 22. The pressure sensor is placed in the back recessed pocket 38 of the fastener puller 22 and connected to an indicator such as a light 104 (FIG. 6). The indicator can be any suitable type of indicator. The indicator can be in any suitable location. In the embodiment shown, the light 104 is situated near the push button mechanism 77.

Figure 9:
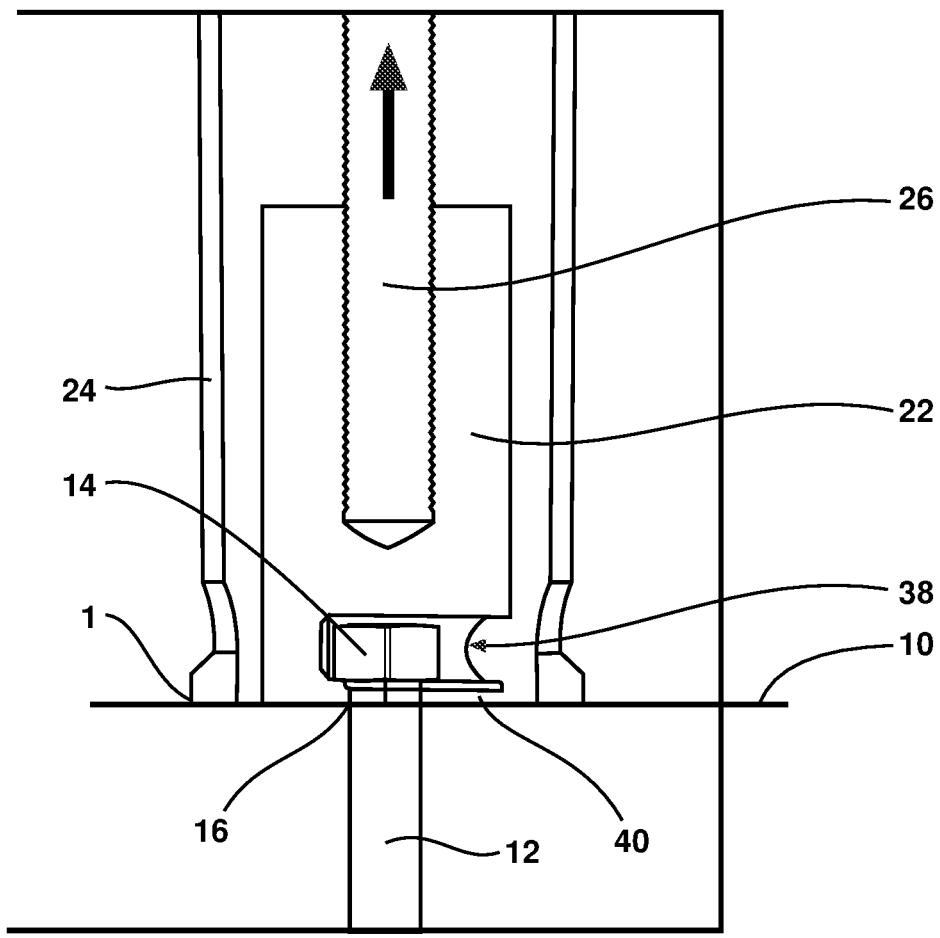
FIG. 9 is a cross-sectional view of a portion of the fastener removal tool showing the fastener puller initially engaging the head of a fastener.
Figure 10:
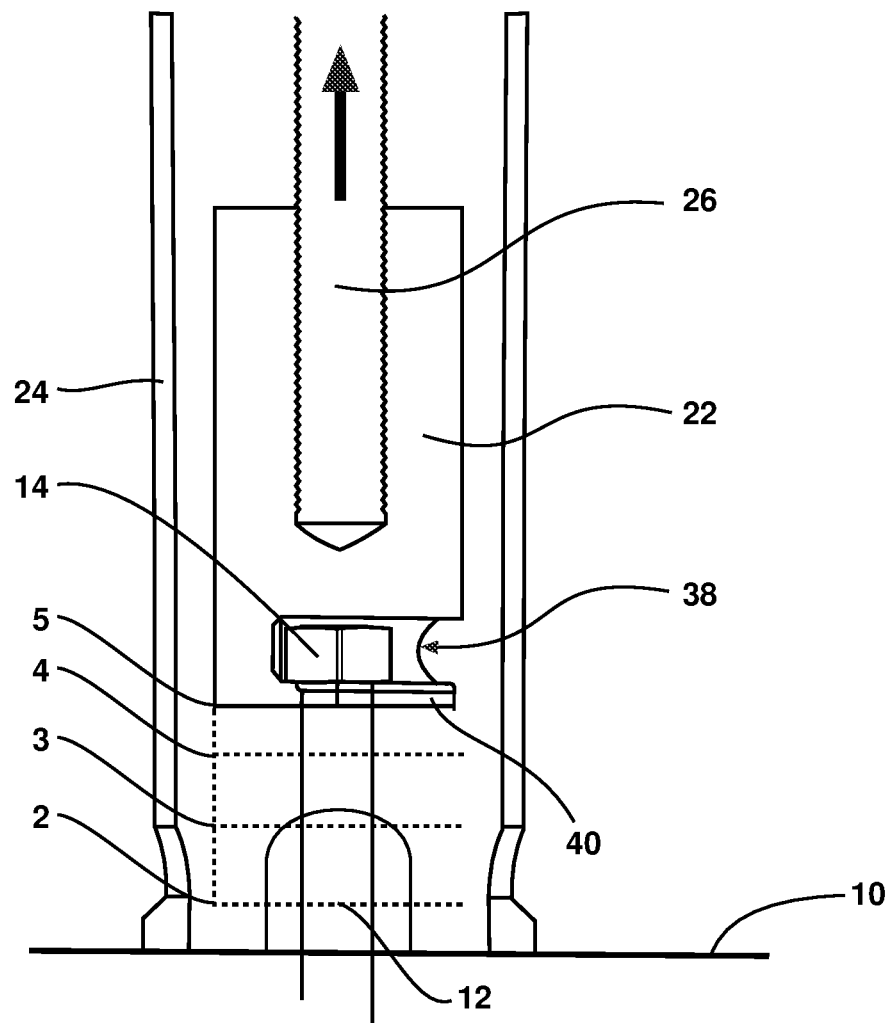
FIG. 10 is a cross-sectional view similar to that shown in FIG. 9 showing a sequence of positions of the fastener puller after it has partially pulled the fastener out of the surface to which it was affixed.

The fastener removal tool 20 can be used as shown in FIGS. 9 and 10. The tool 20 is used for the removal of fasteners 12 that become stuck after the bottom of the fastener head 14 is exposed. The fastener may have been partially removed through various means and then became stuck with a portion of the neck exposed above the plane of the work surface. The fastener removal tool 20 will function on any fastener 12 that is stuck in a surface 10 (or in its housing that is embedded in a surface) as long as the bottom of the fastener head 14 is exposed and the stand-off mount 24 can brace against the surface 10 of the article containing the fastener. Thus, it may be desirable for the work surface to be flat enough, at least in the area of the fastener, for the standoff mount to (have sufficient purchase to) rest against.

In the case of a pneumatic fastener removal tool 20, the fastener removal tool 20 is connected to a source of compressed air. The compressed air causes the piston rod 68 (shown in FIG. 3) of the pneumatic cylinder 30 to extend and the puller 22 to protrude slightly from the standoff mount 24 (as shown in FIG. 1). The fastener puller 22 is slid around the neck 16 and under the head 14 of the fastener 12. If the fastener removal tool 20 is provided with a sensor system, this activates the pressure sensor 102 at the back of the fastener puller 22. This may illuminate a light 104 that is positioned near the actuator, such as actuation button 77 that indicates the fastener is correctly placed in the fastener puller 22. The operator then presses and holds the actuation button 77 on the flow control device. This causes the air flow direction to change, and the cylinder 30 retracts slowly which pulls the fastener out. The operator then releases the button, and the cylinder 30 returns to an extended position where the fastener can now be slid out of the puller 22 and removed therefrom. Should the fastener fail to extract, the operator can release the lubricating liquid from the liquid tank 90 to assist in breaking the fastener loose.

Figure 11:
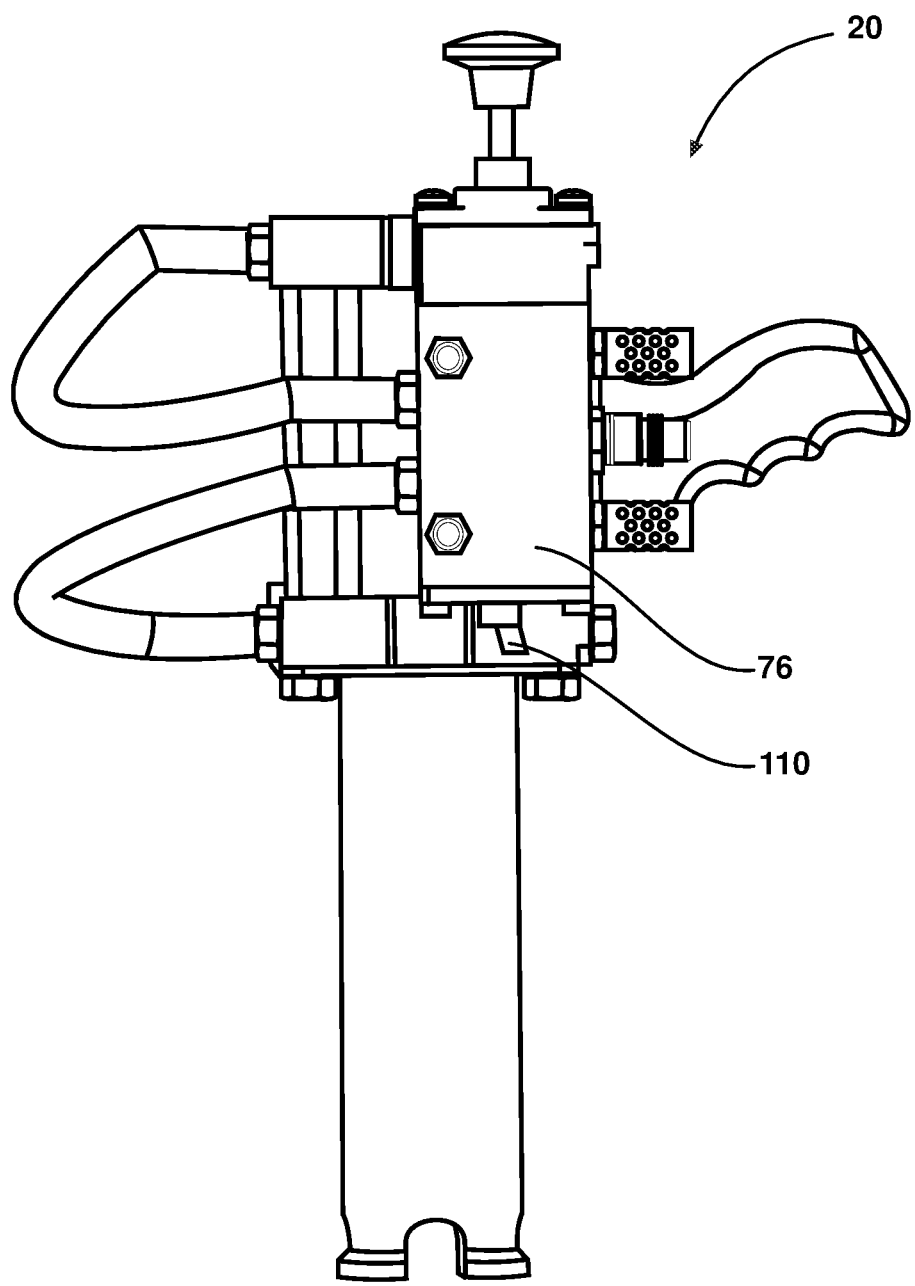
FIG. 11 is a side view of an embodiment of a fastener removal tool with a selector switch for selecting different modes of applying a force to remove a fastener.

FIG. 10 shows that the operator also has the option to activate the quick alternating solenoid that will cause the piston rod 68 of the pneumatic cylinder 30 to rapidly extend and retract as it pulls up on the fastener head 14. FIG. 11 shows that the fastener removal tool 20 may be provided with a selector, such as a switch 110, for selecting the type of movement of the first rod between two modes of applying a force to remove a fastener: (a) exerting a continuous pulling force with said fastener puller, or (b) exerting a pulling force in the form of repeating intermittent strikes on the underside of the head of a fastener with the fastener puller. FIGS. 9 and 10 show the exertion of a pulling force in the form of a repeating intermittent strikes on the underside of the head of a fastener schematically. FIG. 9 shows the fastener puller 22 in a first position, position number 1. FIG. 10 shows the fastener puller 22 in positions numbered 2-5. In this operation, the fastener puller 22 loses contact with the bottom of the fastener head 14 while it extends and strikes it with increased force when the direction switches and the piston rod 68 retracts, hammering the fastener head 14 from underneath in an effort to extract the fastener.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

The fastener puller 22 and the standoff mount 24 can be easily removed and replaced with differently sized pieces in order to fit various fasteners and surface situations. The air flow control manifold 76 can be changed to similarly functioning air flow control devices as long as they include a 2-direction air flow and exhaust capability. The pneumatic tie rod cylinder 30 can be replaced with a similarly sized and similarly powerful, or stronger, 2-way actuating pneumatic cylinder. A trigger can be added to the handle 34 in order to control air flow direction rather than the push button design shown. An oscillation system can be added to the air flow control to cause the air cylinder to rapidly oscillate in and out as it retracts and pulls the fastener out. An air pressure regulator can be joined to the fastener removal tool 20 in order to control the force exerted by the pneumatic cylinder.

In other embodiments, the pneumatic cylinder 30, air flow control manifold 76, air hoses 80, and other components of the pneumatic system can be replaced with components of a hydraulic system. In such a case, rather than being connected to a supply of compressed air, the hydraulic system will be connected to a supply of hydraulic fluid. In still other embodiments, the pneumatic system components may be replaced with components of a magnetic, electric, or electronic system. In these latter embodiments, an electric motor can be used to power the system.

The fastener removal tool 20 described herein can provide a number of advantages. It should be understood, however, that these advantages need not be required unless they are set forth in the appended claims.

The fastener removal tool 20 greatly improves the efficiency and safety of the process to remove stuck fasteners. This tool will relieve the user of any manual labor and increase their ability to remove difficult to extract fasteners. The fastener removal tool 20 will also protect the surface of the item to which the fasteners are connected. The fastener removal tool 20 will protect the user of the tool from debris, and will actuate in a smooth controllable motion. The configuration of the fastener removal tool ensures that the operator places both hands on the tool to reduce the possibility of injury to the operator's appendages. The fastener removal tool 20 will be useful for multiple differently sized fasteners, and will be useful in a wide range of conditions and spaces. (The tool itself employs a pneumatic cylinder to extract the fasteners in a linear motion.)

As used herein, an element or step recited in the singular and preceded with the word "a" or "an" should be understood as including the plural of such elements or steps, unless the plural of such elements or steps is specifically excluded.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A fastener removal tool for removing a fastener having a head that is partially protruding from the surface of an article, said fastener removal tool comprising:
   a fastener puller for engaging the head of a fastener, the head of the fastener having a top surface and an underside;
   a stand-off mount for placing against a surface having a fastener therein, said stand-off mount having two ends comprising a surface-contacting end and an opposing end, and a passageway between said ends;
   a first rod joined to said fastener puller and passing at least part of the way through the passageway in the stand-off mount;
   a power source having a piston rod joined to said first rod, wherein the power source controls the motion of said first rod; and
   a selector in communication with the power source for selecting the type of movement of the first rod between two modes of applying a force to remove a fastener: (a) exerting a continuous pulling force with said fastener puller, or (b) exerting a pulling force in the form of repeating intermittent strikes on the underside of the head of a fastener with said fastener puller.

2. A fastener removal tool for removing a fastener having a head that is partially protruding from the surface of an article, said fastener removal tool comprising:
   a fastener puller for engaging the head of a fastener, the head of the fastener having a top surface and an underside;
   a stand-off mount for placing against a surface having a fastener therein, said stand-off mount having two ends comprising a surface-contacting end and an opposing end, and a passageway between said ends;
   a first rod joined to said fastener puller and passing at least part of the way through the passageway in the stand-off mount;
   a power source having a piston rod joined to said first rod, wherein the power source controls the motion of said first rod; and
   a sensor for determining if the fastener puller is properly positioned to remove a fastener, wherein said fastener removal tool is configured to have one setting in which the fastener removal tool exerts a pulling force on the head of a fastener in the form of repeating intermittent strikes on the underside of the head of a fastener with said fastener puller.

3. A fastener removal tool for removing a fastener having a head that is partially protruding from the surface of an article, said fastener removal tool comprising:
- a fastener puller for engaging the head of a fastener, the head of the fastener having a top surface and an underside;
- a stand-off mount for placing against a surface having a fastener therein, said stand-off mount having two ends comprising a surface-contacting end and an opposing end, and a passageway between said ends;
- a first rod joined to said fastener puller and passing at least part of the way through the passageway in the stand-off mount;
- a power source having a piston rod joined to said first rod, wherein the power source controls the motion of said first rod; and
- an indicator mechanism for indicating whether the fastener puller completely engages a fastener, wherein the indicator mechanism comprises a pressure sensor inside of the fastener puller that illuminates a light to indicate that the fastener puller is correctly placed on the head of the fastener,
- wherein said fastener removal tool is configured to have one setting in which the fastener removal tool exerts a pulling force on the head of a fastener in the form of repeating intermittent strikes on the underside of the head of a fastener with said fastener puller.

4. A fastener removal tool for removing a fastener having a head that is partially protruding from the surface of an article, said fastener removal tool comprising:
- a fastener puller for engaging the head of a fastener, the head of the fastener having a top surface and an underside;
- a stand-off mount for placing against a surface having a fastener therein, said stand-off mount having two ends comprising a surface-contacting end and an opposing end, and a passageway between said ends;
- a first rod joined to said fastener puller and passing at least part of the way through the passageway in the stand-off mount;
- a power source having a piston rod joined to said first rod, wherein the power source controls the motion of said first rod; and
- a fastener lubricating system joined to the fastener removal tool, wherein said fastener lubricating system is configured to deliver a lubricating liquid onto the fastener being removed,
- wherein said fastener removal tool is configured to have one setting in which the fastener removal tool exerts a pulling force on the head of a fastener in the form of repeating intermittent strikes on the underside of the head of a fastener with said fastener puller.

5. A fastener removal tool for removing a fastener having a head that is partially protruding from the surface of an article, said fastener removal tool comprising:
- a fastener puller for engaging the head of a fastener, the head of the fastener having a top surface and an underside;
- a stand-off mount for placing against a surface having a fastener therein, said stand-off mount having two ends comprising a surface-contacting end and an opposing end, and a passageway between said ends;
- a first rod joined to said fastener puller and passing at least part of the way through the passageway in the stand-off mount;
- a power source having a piston rod joined to said first rod, wherein the power source controls the motion of said first rod; and
- a fastener lubricating system joined to the fastener removal tool, wherein the fastener lubricating system comprises a liquid tank containing a lubricating liquid that is joined to said pneumatic cylinder, and a liquid transport tube connects to the end of the valve and carries the liquid into a channel in the fastener puller,
- wherein said fastener removal tool is configured to have one setting in which the fastener removal tool exerts a pulling force on the head of a fastener in the form of repeating intermittent strikes on the underside of the head of a fastener with said fastener puller.

6. The fastener removal tool of claim 5 wherein the lubricating liquid comprises at least one of: a solvent, a penetrating lubricant, and liquid nitrogen.

7. A fastener removal tool for removing a fastener having a head that is partially protruding from the surface of an article, said fastener removal tool comprising:
- a fastener puller for engaging the head of a fastener, the head of the fastener having a top surface and an underside;
- a stand-off mount for placing against a surface having a fastener therein, said stand-off mount having two ends comprising a surface-contacting end and an opposing end, and a passageway between said ends;
- a first rod joined to said fastener puller and passing at least part of the way through the passageway in the stand-off mount;
- a power source having a piston rod joined to said first rod, wherein the power source controls the motion of said first rod; and
- wherein said fastener removal tool is configured to have one setting in which the fastener removal tool exerts a pulling force on the head of a fastener in the form of repeating intermittent strikes on the underside of the head of a fastener with said fastener puller, wherein the piston rod extends and retracts when the fastener removal tool exerts a pulling force on the head of a fastener in the form of repeating intermittent strikes on the underside of the head of a fastener with said fastener puller, wherein when the piston rod extends, the fastener puller loses contact with the underside of the head of the fastener, and when the piston rod retracts, the fastener puller strikes the underside of the fastener head with increased force, hammering the fastener head from underneath.

8. A method of removing a fastener from an article, the fastener having a body and a head joined to the body, wherein the fastener head has a top surface and an underside, wherein the fastener head protrudes from the surface of the article so that a gap is provided between the underside of the fastener head and the surface of the article, said method comprising:
a) providing a powered fastener removal tool comprising:
- a fastener puller for engaging the head of a fastener;
- a stand-off mount for placing against a surface of an article having a fastener therein, wherein the stand-off mount has a passageway therethrough and the fastener puller is positioned for reciprocating motion in said passageway; and a power source operatively connected to said fastener puller, wherein the power source controls the motion of said fastener puller;

b) placing the stand-off mount against the surface of the article and engaging the head of the fastener with the fastener puller; and c) exerting a repeating intermittent striking force on the underside of the head of a fastener with the fastener puller using said powered fastener removal tool, wherein the reciprocating motion of the fastener puller is such that in step e), when the fastener removal tool exerts a pulling force on the head of a fastener in the form of repeating intermittent strikes on the underside of the head of a fastener with said fastener puller, the fastener puller loses contact with the underside of the head of the fastener, and the fastener puller then switches directions and the fastener puller strikes the underside of the fastener head with increased force, hammering the fastener head from underneath.

9. A fastener removal tool for removing a fastener having a head that is partially protruding from the surface of an article, said fastener removal tool comprising:

a fastener puller for engaging the head of a fastener, the head of the fastener having a top surface and an underside;

a stand-off mount for placing against a surface having a fastener therein, said stand-off mount having two ends comprising a surface-contacting end and an opposing end, and a passageway between said ends;

a first rod joined to said fastener puller and passing at least part of the way through the passageway in the stand-off mount;

a power source having a piston rod joined to said first rod, wherein the power source controls the motion of said first rod, wherein the power source is a pneumatic cylinder; and an air flow direction control device operationally connected to the pneumatic cylinder, wherein the air flow direction control device comprises an alternating solenoid, wherein said fastener removal tool is configured to have one setting in which the fastener removal tool exerts a pulling force on the head of a fastener in the form of repeating intermittent strikes on the underside of the head of a fastener with said fastener puller, wherein the alternating solenoid causes the piston rod to extend and retract which provides said repeating intermittent strikes.

10. A method of removing a fastener from an article, the fastener having a body and a head joined to the body, wherein the fastener head has a top surface and an underside, wherein the fastener head protrudes from the surface of the article so that a gap is provided between the underside of the fastener head and the surface of the article, said method comprising:

a) providing a powered fastener removal tool comprising:

a fastener puller for engaging the head of a fastener;

a stand-off mount for placing against a surface of an article having a fastener therein, wherein the stand-off mount has a passageway therethrough and the fastener puller is positioned for reciprocating motion in said passageway;

a power source operatively connected to said fastener puller, wherein the power source controls the motion of said fastener puller, wherein the power source is a pneumatic cylinder; and an air flow direction control device operationally connected to the pneumatic cylinder, wherein the air flow direction control device comprises an alternating solenoid that causes the fastener puller to extend and retract;

b) placing the stand-off mount against the surface of the article and engaging the head of the fastener with the fastener puller; and c) exerting a repeating intermittent striking force on the underside of the head of a fastener with the fastener puller using said powered fastener removal tool.

* * * * *